United States Patent
Daoud

(10) Patent No.: US 6,278,061 B1
(45) Date of Patent: Aug. 21, 2001

(54) CONCENTRIC RETAINER MECHANISM FOR VARIABLE DIAMETER CABLES

(75) Inventor: Bassel Hage Daoud, Parsippany, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/428,728

(22) Filed: Oct. 28, 1999

(51) Int. Cl.$^7$ ........................................ H02G 3/18
(52) U.S. Cl. .................. 174/65 R; 174/65 SS; 16/2.1; 248/56; 439/604
(58) Field of Search ............... 174/65 R, 65 G, 174/65 SS, 11 BH, 135, 151; 248/56; 16/2.1, 2.2; 439/604

(56) References Cited

U.S. PATENT DOCUMENTS

| 4,739,126 | * | 4/1988 | Gutter et al. | ................. 174/65 SS |
|---|---|---|---|---|
| 5,276,280 | * | 1/1994 | Ball | ........................... 174/65 R |
| 5,811,728 | * | 9/1998 | Maeda | ......................... 174/65 R |

FOREIGN PATENT DOCUMENTS

| 1232834 | * | 5/1971 | (GB) | ................................. 174/65 R |
|---|---|---|---|---|
| 2269945 | * | 2/1994 | (GB) | ................................. 174/65 G |

\* cited by examiner

*Primary Examiner*—Dean A. Reichard
*Assistant Examiner*—Dhiru R Patel
(74) *Attorney, Agent, or Firm*—Schnader Harrison Segal & Lewis LLP

(57) ABSTRACT

A cable retaining mechanism has a hollow body containing a plurality of projections extending radially into the hollow cavity. The projections are spaced equidistantly from each other and have a resiliency such that each projection exerts equal retaining pressure on the cable passing through the hollow body. The equal pressure retains the cable in a central location within the hollow body. This allows for symmetrical application of a shrinkable protective layer to secure the cable and mechanism.

10 Claims, 3 Drawing Sheets cable-retaining mechanism. More specifically the invention relates to a mechanism having resilient, internal rib projections for centering a cable within a retainer housing.

CONCENTRIC RETAINER MECHANISM FOR VARIABLE DIAMETER CABLES

BACKGROUND

1. Field of the Invention

The present invention relates to a device for holding and retaining cables. More specifically the invention relates to a mechanism having resilient, internal rib projections for centering a cable within a retainer housing.

2 Description of the Related Art

In today's wide variety of electrical devices, it is common to have boxes or other housings with cable ports for receiving cable. The cable port is an entry point for cable as well as undesirable elements such as insects, small animals, wind, and rain. Accordingly, many methods have been used to seal the cable port and electrical box from these nuisances.

Sealants such as caulking have been used, but in recent years have been disfavored. Caulking is difficult to work with, does not clean up easily, and takes substantial removal effort in the event repairs are needed. Currently, heat-shrink or even cold-shrink tubing are preferred for their ease of use and relatively clean application.

Heat-shrinkable tubing is placed around the cable port and cable at the interface thereof. Heat is then applied to the tubing, causing it to conform to the shape of the cable and cable port. The space between the cable and the cable port is, thus, sealed. As the tubing is shrunk, heat must be applied evenly or one portion of the tubing will shrink before the remaining portions. Uneven heating and shrinking lead to aconcentric, noncentered positioning of cable within the cable port.

Similarly, cold shrinkable tubing may also be used. Typically, an expanded tube, maintained in that state by a rigid core, is placed around the cable port and cable at the interface thereof. Once in position, the rigid core is removed and shrinkable tubing to conforms to the shape of the cable port and cable, just as in the heat-shrinkable variety.

The recurring problem in both of these systems concerns the aconcentric enclosing of cable passing through the cable port. When the shrinkable tubing is applied, the cable must be held in a central position in order to obtain the optimal seal. When uncentered, the cable causes the shrinkable tubing to stretch and conform asymmetrically. The asymmetrical nature of the tubing forms an inferior seal and results in stresses on the cable and the shrinkable tubing. Misalignment of the cable within the electrical housing may also result.

The shrinkable tubing has been favored because it easily adapts to the wide range of shapes and diameters of available cable. In order to limit stress and cable misalignment and achieve a better seal, it is desirable to ensure that the cable is centered within the cable port and shrinkable tubing.

SUMMARY OF THE INVENTION

A cable retaining mechanism has a hollow body containing a plurality of projections extending radially into the hollow cavity. The projections are spaced equidistantly from each other and have a resiliency such that each projection exerts equal retaining pressure on the cable passing through the hollow body. The equal pressure retains the cable in a central location within the hollow body. This allows for symmetrical application of a shrinkable protective layer to secure the cable and mechanism.

DETAILED DESCRIPTION OF THE PREFERRED EMBODIMENT

Figure 1:
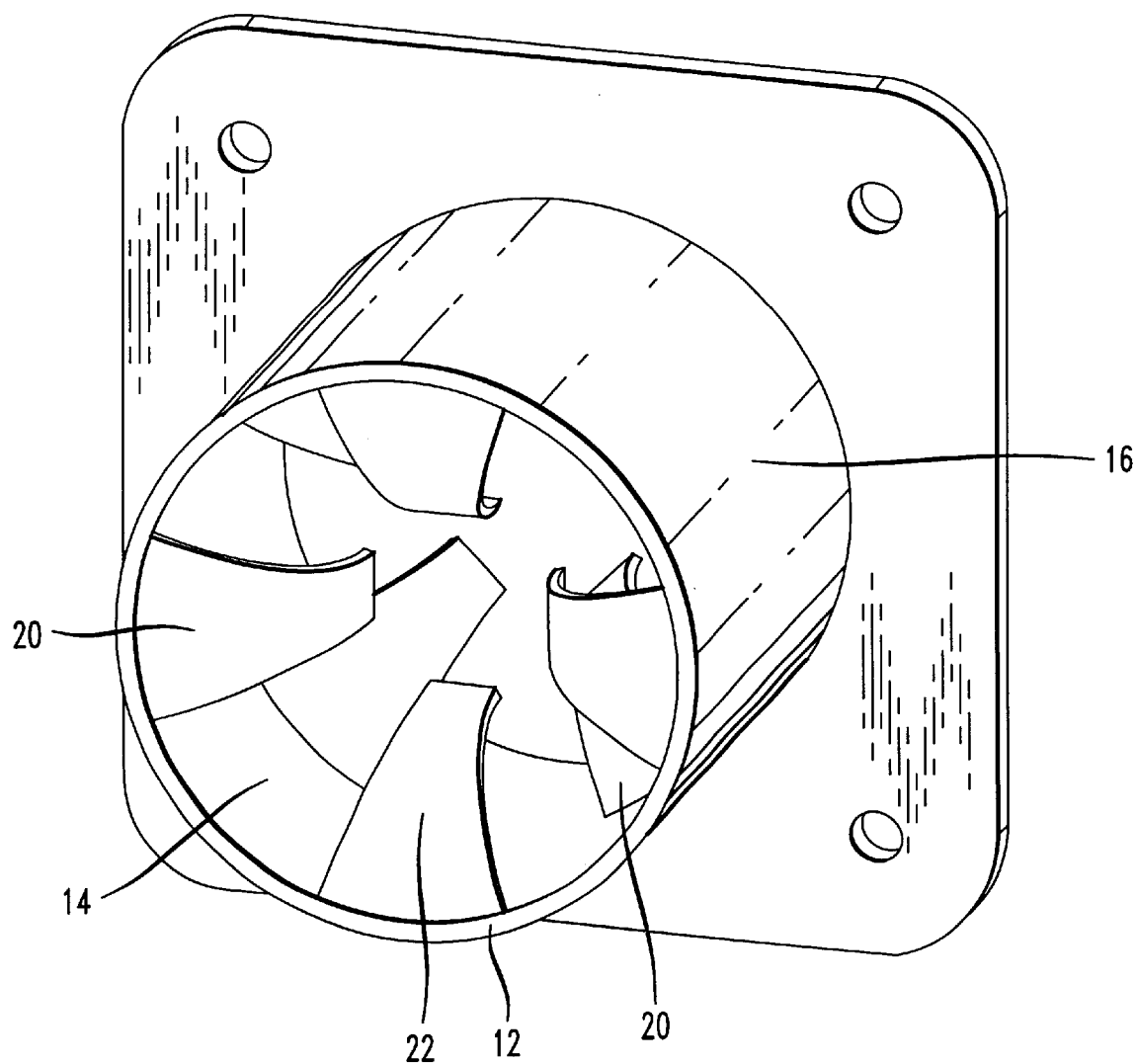
FIG. 1 is a perspective view of a cable-retaining mechanism of the present invention.

The preferred embodiment is discussed with reference to the drawing figures wherein reference numerals designate like elements throughout.

The retainer mechanism 10 of the invention can either be a separate piece for attachment to a housing H or other body for receiving cable, or may be integrally formed as part of the housing H. In either case, the retaining mechanism 10 comprises a hollow body having a plurality of internal resilient projections 20. The retaining mechanism 10 is used to replace the standard cable port.

The hollow body is preferably cylindrical, but may take other shapes. A cylindrical body is preferred because it allows for concentric alignment of common round cable C within the retaining mechanism 10. The cylindrical shape also puts less strain on the shrinkable material 30 which is typically tubular.

The hollow body is made up of a side wall 12 which defines a hollow cavity within. The hollow cavity forms a longitudinal pathway through which cable C is routed. The side wall 12 has an interior surface 14 which defines the hollow cavity, and an exterior surface 16.

From the interior surface 14 of the side wall 12 extend a plurality of resilient projections 20. Each projection 20 is formed substantially identical to the others to ensure that each projection 20 has a substantially equal effect on the cable C passing through the mechanism. If one projection 20 is weaker than the others, the cable C will not be maintained in a central location, but rather pushed towards the weaker projection.

Each projection 20 preferably has a truncated triangular or trapezoidal shape, having a wide, arcuate end corresponding to the inner surface 14 of the side wall 12. Each projection has a substantially flat cable-engaging surface 22. Narrowing as it projects radially inward, each projection 20 is designed to engage the cable without interfering with the remaining projections. Each projection 20 extends from an equidistantly spaced location along a perimetric line defined by the intersection of the hollow body and a plane perpendicular to the longitudinal pathway.

Preferably, at least three equidistantly spaced projections 20 will be used to ensure concentric positioning of the cable C within the hollow body. The projections may have a slight curvature designed to aid in the insertion of the cable C as well as to aid in preventing accidental withdrawal. The projections curve toward the housing H or electrical box. With this arrangement, cable C is easily directed through the hollow body during installation. However, if the cable C is pulled in the opposite direction, the curved projections resist the removal of the cable. This is not to say removal is impossible, but that removal does not occur readily upon accidental exertion of a removing force.

In the preferred embodiment, at least two rows of projections 20, with at least three projections 20 in each row will be used. As described above, the projections 20 are substantially identical and equidistantly spaced in each row. The two rows of projections 20, however, will preferably have an alternating relationship. As seen in FIG. 1, the spaces below the projections 20 of the first row correspond to the projections 20 in the second row and vice versa. This arrangement ensures equal pressure on all sides of cable.

The above discussed embodiments are particularly well-suited to holding round or circular cross-section cable. The device, however, will work well with most flat or oblong cable as well. To accommodate these special shapes, it is beneficial to have at least four projections 20, each projection 20 corresponding to the top, bottom and two sides of the cable.

Regardless of the embodiment used, the cable retaining mechanism of the present invention aligns and maintains cable in a central location within the mechanism such that shrinkable tubing 30 or other material can be applied to seal the cable within the hollow body leading to the electrical housing or box. The central location of the cable ensures the formation of a tight seal by avoiding stress in the shrinkable tubing 30. The mechanism 10 also holds the cable C in the appropriate location while freeing a worker's hands during the installation.

Figure 2:
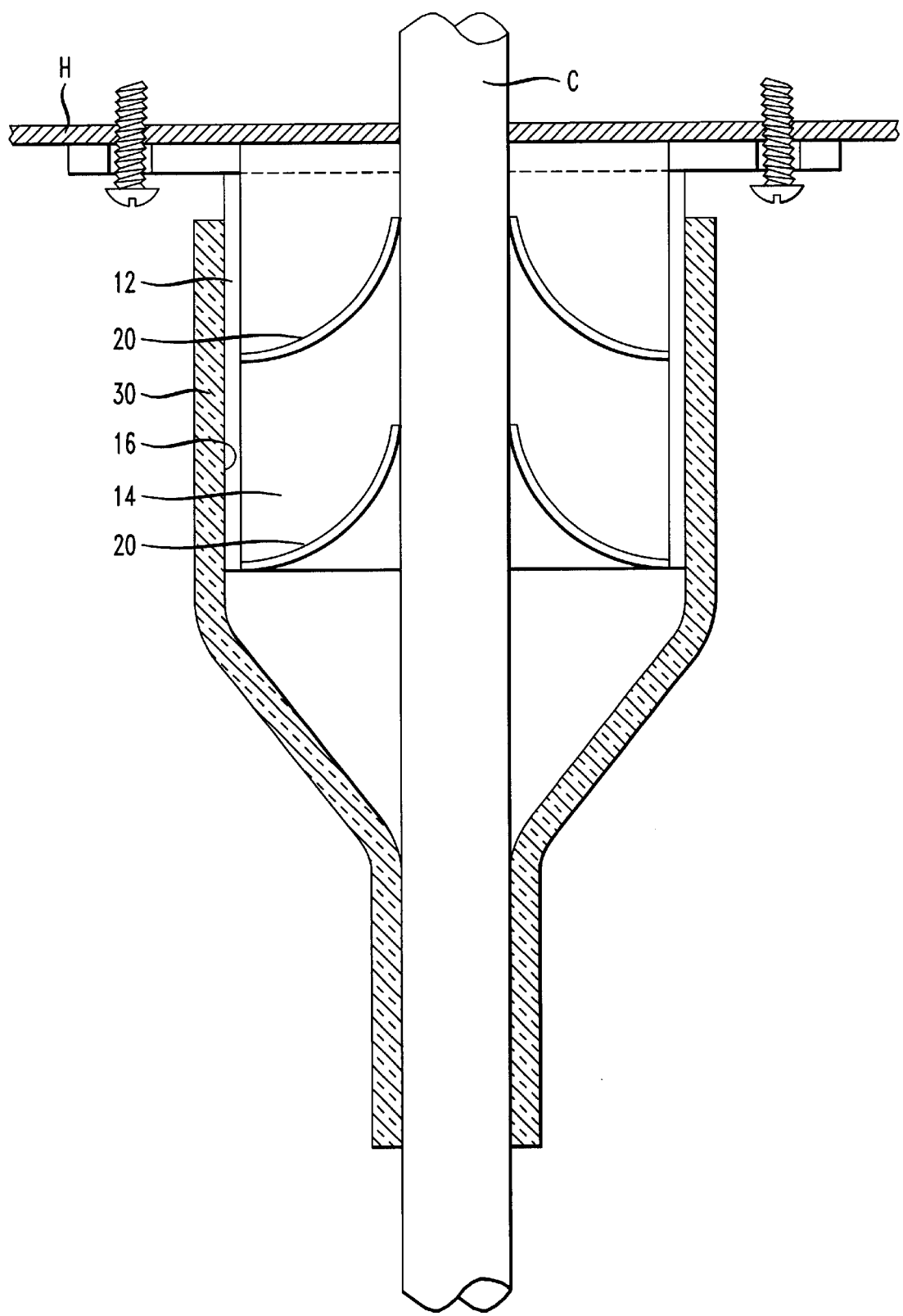
FIG. 2 is a side cross-sectional view of a cable-retaining mechanism of the present invention.
Figure 3:
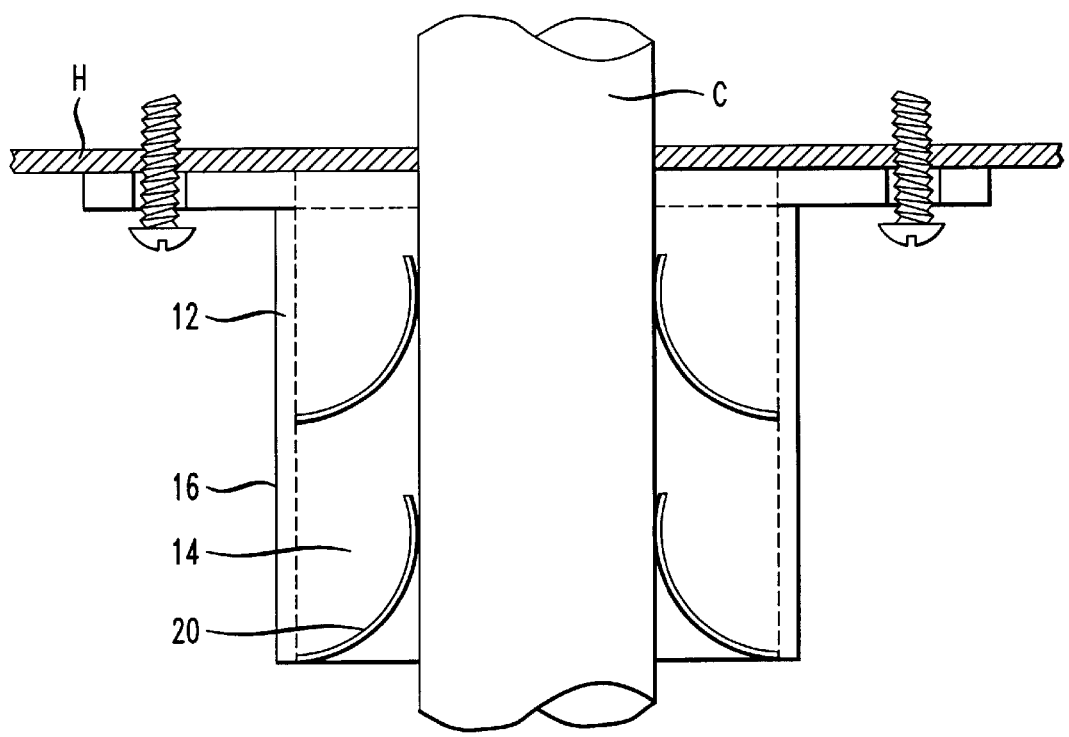
FIG. 3 is a side cross-sectional view of a cable retaining mechanism.
Figure 4:
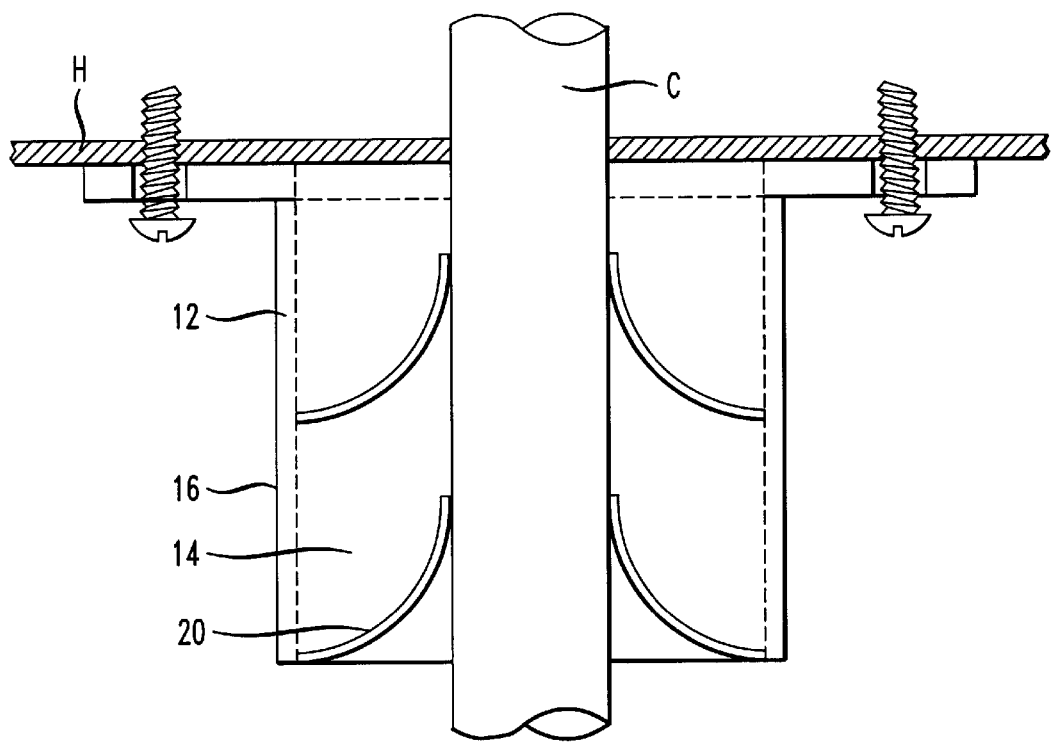
FIG. 4 is a side cross-sectional view of a cable retaining mechanism.

As seen in FIGS. 2–4, the cable C passes through the hollow body, engaging each of the projections 20. Each projection 20 exerts an equal force on the cable C, by which the cable C is retained in a central position within the hollow body. The heat-shrinkable tubing is then easily and properly applied. As seen in FIGS. 3 and 4, the device is readily usable with narrow cable and wider cable due to the resilient nature of the projections.

The above described retainer mechanism satisfies the need for a device that reduces stress in the cable and components to which it is connected while allowing a better seal to be made about the cable port.

What is claimed is:

1. A retainer mechanism for holding an elongated member therein, comprising:
   a hollow body having a side wall defining a longitudinal hollow cavity for receiving the elongated member; and
   a plurality of radial projections, each of said plurality of projections extending inwardly from said side wall; said projections being equidistantly spaced and resilient for engaging and retaining the elongated member in a centered position relative to said side wall.

2. The retainer mechanism of claim 1 wherein each of said projections extends from a position along a perimetric line defined by a plane perpendicular to the longitudinal direction of said side wall.

3. The retainer mechanism of claim 1 wherein said mechanism comprises at least three projections.

4. The retainer mechanism of claim 1, wherein said hollow body is substantially cylindrical in shape.

5. The retainer mechanism of claim 1, wherein each of said plurality of projections is curved in a direction corresponding to an insertion direction of an elongated member.

6. The retainer mechanism of claim 5 wherein each perimetric path contains at least three projections.

7. The retainer mechanism of claim 5 wherein said projections of a first of said perimetric paths are in substantially non-overlapping, alternating relationship with said projections of a second of said perimetric paths.

8. The retainer mechanism of claim 5, wherein each of said plurality of projections is curved in a direction corresponding to an insertion direction of the elongated member.

9. A retainer mechanism for holding an elongated member therein, comprising:
   a hollow body having a side wall defining a longitudinal hollow cavity for receiving the elongated member; and
   a plurality of radial projections each extending inwardly from said side wall; each of said projections being equidistantly spaced and resilient for engaging and retaining the elongated member in a centered position relative to said side wall;
   wherein each of said projections extends from a position along one of at least two a perimetric line, each path is defined by a plane perpendicular to the longitudinal direction of said side wall.

10. A retainer mechanism for holding an elongated member therein, comprising:
    a hollow body having a side wall defining a longitudinal hollow cavity for receiving an elongated member; and
    a plurality of radial projections each extending inwardly from said side wall; said projections being equidistantly spaced and resilient for engaging and retaining the elongated member in a centered position relative to said side wall;
    wherein said mechanism is adapted for elongate members having non-circular, oblong cross-sectional shapes by having at least four projections, arranged about 90 degrees from each other are employed for retaining the cable in a centered position.

* * * * *